US012538002B2

(12) United States Patent
Thomas et al.

(10) Patent No.: US 12,538,002 B2
(45) Date of Patent: Jan. 27, 2026

(54) INFRARED THERMOGRAPHIC SYSTEM AND ASSOCIATED METHOD

(71) Applicant: HGH SYSTEMES INFRAROUGES, Igny (FR)

(72) Inventors: Anthony Thomas, Massy (FR); Axel Davy, Palaiseau (FR); Gilles Aubry, Gometz le Chatel (FR); Frédéric Alves, Paris (FR); Vincent Leboucher, Paris (FR)

(73) Assignee: HGH SYSTEMES INFRAROUGES, Igny (FR)

( * ) Notice: Subject to any disclaimer, the term of this patent is extended or adjusted under 35 U.S.C. 154(b) by 30 days.

(21) Appl. No.: 18/246,396

(22) PCT Filed: Sep. 24, 2021

(86) PCT No.: PCT/EP2021/076364
§ 371 (c)(1),
(2) Date: Mar. 23, 2023

(87) PCT Pub. No.: WO2022/063987
PCT Pub. Date: Mar. 31, 2022

(65) Prior Publication Data
US 2023/0362465 A1    Nov. 9, 2023

(30) Foreign Application Priority Data

Sep. 25, 2020  (FR) ...................................... 2009797

(51) Int. Cl.
*H04N 23/23*    (2023.01)
*G01B 11/02*    (2006.01)
(Continued)

(52) U.S. Cl.
CPC ........... *H04N 23/23* (2023.01); *G01B 11/026* (2013.01); *G01J 5/0066* (2013.01); *G01J 5/80* (2022.01);
(Continued)

(58) Field of Classification Search
CPC ......... H04N 23/23; H04N 23/698; G01J 5/80; G01J 5/0066; G01J 2005/0077; G01B 11/026
(Continued)

(56) References Cited

U.S. PATENT DOCUMENTS

2005/0285953 A1    12/2005  Hasegawa et al.
2007/0153871 A1*    7/2007  Fraden .................. A61B 5/015
                                                        374/121
(Continued)

FOREIGN PATENT DOCUMENTS

EP            2577242 B1       10/2018
WO    WO-2004027459 A2 *    4/2004    ................ G01J 5/62
(Continued)

OTHER PUBLICATIONS

International Search Report and Written Opinion received for PCT/EP2021/076364, mailed Jan. 7, 2022.
(Continued)

*Primary Examiner* — Jessica M Prince
(74) *Attorney, Agent, or Firm* — Greer, Burns & Crain, Ltd (57) ABSTRACT

An infrared thermographic system configured to detect the temperature of an object including an infrared thermal imaging sensor arranged to collect infrared radiation and construct at least one image from the radiation and a drive support unit arranged to rotate the sensor around an axis of rotation is provided. The imaging sensor is attached to the drive support unit such that upon rotation of the drive
(Continued)

support unit, the imaging sensor captures separate areas surrounding the thermographic system. The imaging sensor is arranged to acquire a plurality of separate images such that the combination of the different images forms a continuous panorama of at least 180 degrees about the axis of rotation of the drive support unit. A processing module arranged and/or programmed to determine temperature data of the object from the images acquired by the imaging sensor is also provided.

17 Claims, 1 Drawing Sheet

(51) Int. Cl.
 *G01J 5/00* (2022.01)
 *G01J 5/80* (2022.01)
 *H04N 23/698* (2023.01)
(52) U.S. Cl.
 CPC .... *H04N 23/698* (2023.01); *G01J 2005/0077* (2013.01)
(58) Field of Classification Search
 USPC ........................................................ 348/164
 See application file for complete search history.

(56) References Cited

U.S. PATENT DOCUMENTS

| | | | |
|---|---|---|---|
| 2013/0147966 A1* | 6/2013 | Kostrzewa | H04N 25/76 348/164 |
| 2013/0188010 A1* | 7/2013 | Dortch | H04N 23/698 348/37 |
| 2013/0215928 A1* | 8/2013 | Bellifemine | G01J 5/70 374/121 |
| 2023/0054197 A1* | 2/2023 | Richards | G01J 5/0806 |
| 2023/0079693 A1* | 3/2023 | Urklinski | G06T 7/292 374/121 |

FOREIGN PATENT DOCUMENTS

| | | |
|---|---|---|
| WO | 2016033297 A1 | 3/2016 |
| WO | 2016146704 A1 | 9/2016 |

OTHER PUBLICATIONS

French Search Report received for Application No. 2009797, dated May 31, 2021.

Liu, Z., et al., "Training-Time-Friendly Network for Real-Time Object Detection," published on arXiv:1909.00700v3, Nov. 24, 2019, 8 pages.

* cited by examiner

INFRARED THERMOGRAPHIC SYSTEM AND ASSOCIATED METHOD

BACKGROUND

The present invention relates to an infrared thermographic system configured to detect the temperature (i.e. preferably a temperature measurement) of an object. It also relates to a method implemented by said system.

The field of the invention is the field of thermography, and more particularly the field of real-time infrared thermography.

Such a device makes it possible to improve the accuracy of a measurement of the apparent temperature of an object in an environment.

Currently, infrared cameras utilizing infrared thermography exist, having a fixed field that is more or less wide depending on the choice of the objective and operating at a rate of several Hz to several tens of Hz.

These infrared cameras comprise means for correcting the image, as the infrared detectors are generally not uniform or stable. In fact, the infrared cameras are generally stable from the point of view of gain, but not of offset.

In addition, as the cameras are not stable, they are often equipped with an internal shutter which makes it possible to present a uniform scene to the detector periodically. The internal shutter therefore does not make it possible to present the scene, with the same features as those seen by the objective, to the detector.

It follows that the images corrected with an internal shutter have at least spatial non-uniformities at low spatial frequencies due to the absence of compensation of the parasitic flux of the objective.

The aim of the present invention is to overcome at least one of the aforementioned drawbacks by improving the stability and/or the uniformity and/or the field of view.

SUMMARY

This purpose is achieved with an infrared thermographic system configured to detect or measure the temperature of an object, comprising:
- an image sensor (preferably of thermal infrared images) arranged to collect radiation (preferably infrared) and construct at least one image based on this radiation,
- a drive support arranged to drive the sensor in rotation about an axis of rotation, the image sensor being fastened on the drive support such that, during a rotation of the drive support, the sensor images different distinct areas surrounding the thermographic system, the image sensor being arranged to acquire several distinct images such that combining these different images forms a continuous panorama (preferably of at least 180 degrees, or even 360°) about the axis of rotation of the drive support,
- a processing module arranged and/or programmed to determine temperature data (i.e. preferably to measure the temperature) of said object based on the images acquired by the image sensor.

The infrared thermographic system according to the invention can comprise a near-field infrared reference source called non-uniformity correction source, at least one of the distinct images of each panorama imaging the non-uniformity correction source, the processing module being arranged and/or programmed to correct a spatial non-uniformity of the acquired images as a function of the non-uniformity correction source, i.e. typically, the drive support is preferably arranged to drive the sensor in rotation about an axis of rotation, the image sensor being fastened on the drive support such that at least one of the distinct images of each panorama images the non-uniformity correction source, the processing module being arranged and/or programmed to correct a spatial non-uniformity of the acquired images as a function of the non-uniformity correction source.

The non-uniformity correction source can be situated at a distance from the image sensor such that at least one acquired image, called reference image, images only the non-uniformity correction source.

The processing module can be arranged and/or programmed to correct the spatial non-uniformity by pixel to pixel subtraction, on each of the acquired images, of the spatial non-uniformity of the reference image imaging the non-uniformity correction source and preferably adding thereto the mean value of this non-uniformity.

The infrared thermographic system according to the invention can comprise an infrared reference source, called calibration source, that is thermostatically controlled or equipped with means for measuring its temperature, at least one of the distinct images of each panorama imaging this calibration source, the processing module being arranged and/or programmed for temperature calibration of the acquired images of one and the same panorama as a function of this calibration source.

The calibration source can be thermostatically controlled to a temperature above 33 degrees and/or below 40 degrees.

The processing module can be arranged and/or programmed to:
- determine a distance between the object and the image sensor as a function of a dimension of the object on one of the acquired images and/or determine a position of the object in a field of an image acquired by the image sensor,
- correct the temperature of the object as a function of the determined distance between the object and the image sensor and/or as a function of the position of the object in a field of an image acquired by the image sensor.

The thermographic system according to the invention can comprise at least one visible light image sensor (colour or black and white), arranged to capture the object simultaneously with the infrared image sensor.

The processing module can be arranged and/or programmed to determine surface temperature data (i.e. preferably, to measure the surface temperature) of said object, the system further comprising means for measuring ambient temperature around the object, the processing module being arranged and/or programmed to determine an internal temperature of the object as a function of the surface temperature data (i.e. preferably, as a function of the surface temperature) of said object and of the measured ambient temperature.

The processing module can be arranged and/or programmed to determine different temperature values of the object over time and to determine the maximum value among all the previously determined values.

The infrared thermographic system according to the invention can comprise means for generating a visual or acoustic warning signal if the temperature of the object:
- is above a threshold temperature stored by the processing module, or
- has a temperature difference greater than a threshold difference with respect to temperatures of other objects imaged by the thermographic system.

The means for generating a visual or acoustic warning signal can be arranged and/or programmed to filter out a false warning signal by comparing different measured temperatures of the object.

The processing module can be arranged and/or programmed to eliminate, in images acquired by the image sensor:
 hot spots on the object, and/or
 a background surrounding the object before determining the temperature data (i.e. typically, measuring the temperature) of said object.

The infrared thermographic system can comprise an optical system, the optical system optically connecting the near-field infrared reference source to the image sensor.

The near-field infrared reference source can be close enough to the image sensor to be situated outside the depth of field of the optical system optically connecting the source to the sensor, such that the sensor is arranged to intercept only light rays originating from the source in the focal plane of the optical system optically connecting the source to the sensor.

The optical system can be situated between the near-field reference source and the image sensor.

According to yet another aspect of the invention, an infrared thermographic method is proposed for detecting or measuring the temperature of an object, comprising:
 collecting radiation (preferably infrared) by means of an image sensor (preferably of thermal infrared images) and constructing at least one image based on this radiation,
 driving the sensor in rotation about an axis of rotation by means of a drive support, the image sensor being fastened on the drive support such that, during the rotation of the drive support, the sensor images different distinct areas surrounding a thermographic system comprising said sensor and said drive support, the image sensor acquiring several distinct images such that combining these different images forms a continuous panorama (preferably of at least 180 degrees, or even 360°) about the axis of rotation of the drive support,
 determining (i.e. preferably, measuring), by means of a processing module, temperature data (i.e. preferably the temperature) of said object based on the images acquired by the image sensor.

At least one of the distinct images of each panorama can image a near-field infrared reference source called non-uniformity correction source, the processing module correcting a spatial non-uniformity of the acquired images as a function of the non-uniformity correction source, i.e. typically, during the driving in rotation of the sensor about an axis of rotation by the drive support, the image sensor is fastened on the drive support such that, during the rotation of the drive support, at least one of the distinct images of each panorama can image a near-field infrared reference source called non-uniformity correction source, the processing module correcting a spatial non-uniformity of the acquired images as a function of the non-uniformity correction source.

The non-uniformity correction source can be situated at a distance from the image sensor such that at least one acquired image, called reference image, images only the non-uniformity correction source.

The processing module can correct the spatial non-uniformity by pixel to pixel subtraction, on each of the acquired images, of the spatial non-uniformity of the reference image imaging the non-uniformity correction source and preferably adding thereto the mean value of this non-uniformity.

The infrared thermographic method according to the invention can comprise:
 a thermostatic control and/or a measurement of the temperature of an infrared reference source, called calibration source, and
at least one of the distinct images of each panorama imaging this calibration source, the processing module calibrating the temperature of the acquired images of one and the same panorama as a function of this calibration source.

The calibration source can be thermostatically controlled to a temperature above 33 degrees and/or below 40 degrees.

The processing module can:
 determine a distance between the object and the image sensor as a function of a dimension of the object on one of the acquired images and/or determine a position of the object in a field of an image acquired by the image sensor,
 correct the temperature of the object as a function of the determined distance between the object and the image sensor and/or as a function of the position of the object in a field of an image acquired by the image sensor.

The infrared thermographic method according to the invention can comprise capturing, by at least one visible light image sensor (colour or black and white), the object simultaneously with the infrared image sensor.

The processing module can determine surface temperature data (i.e. preferably, measure the surface temperature) of said object, the method further comprising measuring ambient temperature around the object, the processing module determining an internal temperature of the object as a function of the surface temperature data (i.e. preferably, as a function of the surface temperature) of said object and of the measured ambient temperature.

The processing module can determine different temperature values of the object over time and determine the maximum value among all the previously determined values.

The infrared thermographic method according to the invention can comprise generating a visual or acoustic warning signal if the temperature of the object:
 is above a threshold temperature stored by the processing module, or
 has a temperature difference greater than a threshold difference with respect to temperatures of other objects imaged by the thermographic system.

The generation of the visual or acoustic warning signal can filter out a false warning signal by comparing different measured temperatures of the object.

The processing module can eliminate, on the images acquired by the image sensor:
 hot spots on the object, and/or
 a background surrounding the object before determining the temperature data (i.e. typically, measuring the temperature) of said object.

The infrared thermographic system can comprise an optical system, the optical system optically connecting the near-field infrared reference source to the image sensor.

The near-field infrared reference source can be sufficiently close to the image sensor to be situated outside the depth of field of the optical system optically connecting the source to the sensor, such that the sensor intercepts only light rays originating from the source in the focal plane of the optical system optically connecting the source to the sensor.

The optical system can be situated between the near-field reference source and the image sensor.

BRIEF DESCRIPTION OF THE DRAWINGS

Other advantages and features of the invention will become apparent on reading the detailed description of implementations and embodiments that are in no way limitative, and from the following attached drawings.

DETAILED DESCRIPTION

As these embodiments are in no way limitative, variants of the invention can in particular be considered comprising only a selection of the characteristics described or illustrated hereinafter, in isolation from the other characteristics described or illustrated (even if this selection is isolated within a sentence comprising these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

Firstly, with reference to FIGS. 1 and 2, a first embodiment of the infrared thermographic system (100) according to the invention configured for detecting the temperature of an object (11), will be described.

The system (100) comprises a thermal infrared image sensor (1) arranged to collect infrared radiation and construct at least one image based on this radiation.

The system (100) is arranged and/or programmed to detect, track objects (11) and to associate an object (11) with a corrected apparent temperature measurement. The applications are varied, for example:

detecting individuals with a fever in a wide area,
early detection of fire,
monitoring of industrial processes.

The thermography function is moreover advantageously associated with the function of detecting and/or following intrusions.

The image sensor (1) is typically of the microbolometer thermal infrared type for example. The image sensor (1) perceives the surrounding scene and creates at least one high-resolution image of a limited portion of the panorama.

By "infrared" is meant radiation relative to the natural emission of the objects (11) at ambient temperature or long wave infrared (LWIR), the wavelength of this infrared radiation being situated between 8,000 nm and 14,000 nm for example.

Figure 1:
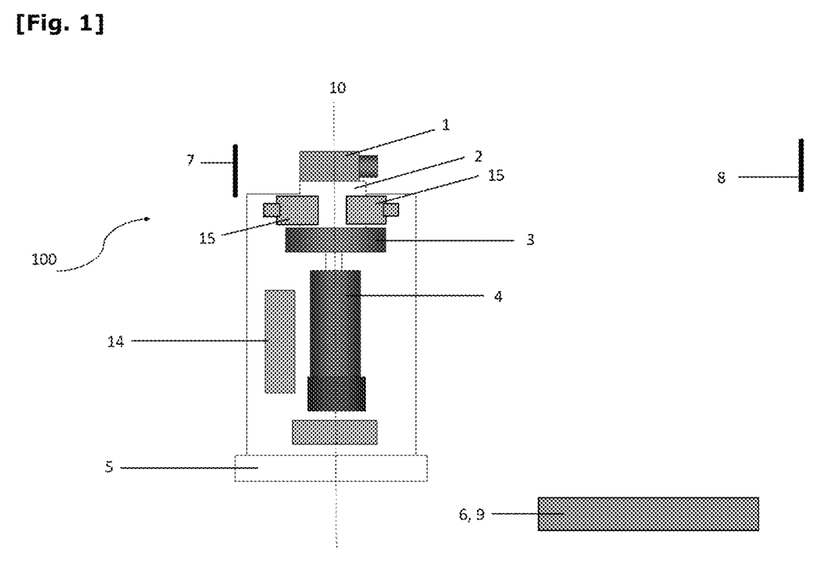
FIG. 1 is a diagrammatic cross section profile view of an infrared thermographic system according to the invention, which is the preferred embodiment of the invention.

According to FIG. 1, the system (100) also comprises a drive support (2) arranged to drive the sensor (1) in rotation about an axis of rotation (10). The image sensor (1) is fastened on the drive support (2) such that, during the rotation of the drive support (2), the sensor (1) images different distinct areas surrounding the thermographic system. The image sensor (1) is arranged to acquire several distinct images such that combining these different images forms a continuous panorama of at least 180 degrees (preferably 360°) about the axis of rotation (10) of the drive support (2).

The image sensor (1) is arranged to acquire the panoramic image by portions, generally by column or by two-dimensional sector for example. The panoramic field of view is suitable for areas in which the movements of persons (11) are multidirectional and unpredictable, such as in a concourse at a station, airport, hospital or commercial 20) area. The construction of a panoramic image based on the several distinct images is carried out by an algorithm or a technology of the "image stitching" or image assembly type.

The system (100) is arranged to widen the field of view of the image sensor (1) to a complete or semi-complete panorama by associating therewith means arranged for real-time correction of the measurement to improve the accuracy of the measurement of the apparent temperature of the objects (11).

The drive support (2) is connected to an electromechanical device (4) for driving in rotation which orients the axis of the image sensor (1) at least in bearing. An orientation of the axis (10) is also of interest depending on the desired vertical field of view.

The electromechanical device (4) for driving in rotation is typically of the compact brushless servomotor type for example.

The drive support (2) is arranged to fasten the image sensor (1) on the shaft of the electromechanical drive device (4). The image sensor (1) has for example a vertical field of at least fifteen degrees, typically of twenty or forty degrees. Advantageously, combining the different images acquired by the image sensor (1) forms a continuous 360° panorama.

The system 100 also comprises a processing module (6) arranged and/or programmed to determine temperature data (i.e. preferably to measure a temperature) of said object (11) based on the images acquired by the image sensor (1).

Determining temperature data or measuring the temperature preferably corresponds to an absolute temperature measurement, the absolute temperature not corresponding to a simple temperature difference with respect to an unknown reference, but corresponding to a real or estimated temperature of the object typically expressed in degrees Celsius, or degrees Fahrenheit or kelvins.

The processing module (6) is thus arranged and/or programmed to measure a temperature of said object (11) based on the images acquired by the image sensor (1).

The module (6) comprises at least one computer, a central processing or calculation unit, an analogue electronic circuit (preferably dedicated), a digital electronic circuit (preferably dedicated), and/or a microprocessor (preferably dedicated) and/or software means.

According to FIG. 1, the system (100) comprises a data transmission device (3) configured to transmit:

the video signal from the image sensor (1) between the mobile part (1) and the fixed part (6),
the electrical supply of the image sensor (1) and
the bidirectional communication signals between the image sensor (1) and the control and communication means (9).

It is a collector configured to transmit the video signal originating from the sensor (1) in a wired or wireless manner to the module (6) and/or to the means (9).

The control and communication means (9) are arranged to control all of the functions of the image sensor (1) and act on the parameters thereof.

The control and communication means (9) comprise at least one computer, a central processing or calculation unit, an analogue electronic circuit (preferably dedicated), a digital electronic circuit (preferably dedicated), and/or a microprocessor (preferably dedicated), and/or software means.

According to FIG. 1, the system (100) is fastened on a fixed base (5).

The system (100) also comprises an electronic module (14) arranged and/or programmed to:
- generate each panoramic image in order to send it to the module (6),
- locally manage the commands addressed to the sensor (1) and to the electromechanical drive device (4), in particular the driving of the elements of the camera (sensor 1 and its optical system) and the communication with the camera,
- receive orders originating from the unit (6) addressed to the sensor (1) and to the electromechanical drive device (4).

The module (14) comprises at least one computer, a central processing or calculation unit, an analogue electronic circuit (preferably dedicated), a digital electronic circuit (preferably dedicated), and/or a microprocessor (preferably dedicated) and/or software means.

The system (100) comprises a near-field infrared reference source (7) called non-uniformity correction source. At least one of the distinct images of each panorama images this non-uniformity correction source. The processing module (6) is arranged and/or programmed to correct the spatial non-uniformity of the acquired images as a function of the non-uniformity correction source. The near-field source (7) is typically of the blackbody type. This source is constituted by a material that is sufficiently dense to have a conduction that provides good thermal uniformity, which guarantees a good correction of the spatial non-uniformities of the sensor (1). The material can advantageously be an aluminium alloy, but if the source is passive, a dense plastic material may be sufficient. The material is covered with a layer having an emissivity close to 1 which can advantageously be deposited in the form of a paint film.

The source 7 is near-field.

By "near-field source" is meant a source that is close enough to the image sensor (1):
- to be situated outside the depth of field of the optical system optically connecting the source (7) to the sensor (1), and
- such that, for at least one position of the drive support (2), the image obtained by the sensor (1) is entirely occupied by this source (7) which amounts to saying that the source (7) covers the entire etendue of the camera (formed by the sensor 1 and the optical system optically connecting the source (7) to the sensor (1)), i.e. the sensor (1) intercepts only light rays originating from the source (7) in the focal plane of the optical system optically connecting the source (7) to the sensor (1).

The near-field source (7) is configured to present a uniform infrared scene to the image sensor (1). Placed in the near field, the source (7) masks at least temporarily a part of the panorama. It is passive or active.

By "active" is meant a thermostatically controlled source (7) and by "passive" is meant a non-thermostatically controlled source (7).

For the requirements of non-uniformity corrections, the near-field source (7) is fitted at an interval to the image sensor (1) in order to be seen at least once by the sensor (1) per panorama. If it is fixed, the source (7) is then presented in each panorama and masks a portion thereof.

The source (7) is advantageously retractable so that the image sensor (1) encounters a 360° horizontal useful field of view during its rotation.

The image sensor 1 is connected to the optical system (not shown in the figure). The optical system optically connects the near-field infrared reference source (7) to the image sensor (1). Advantageously, the optical system is situated between the near-field reference source (7) and the image sensor (1).

Ideally, the optical system forms the assembly of the solid optical elements optically connecting the near-field infrared reference source (7) to the image sensor (1).

The remainder of the elements optically connecting the near-field infrared reference source (7) to the image sensor (1) comprises only gas, typically air.

Ideally, the optical system forms the assembly of the solid optical elements optically connecting the near-field infrared reference source (7) to the image sensor (1).

The remainder of the elements optically connecting the near-field infrared reference source (7) to the image sensor (1) comprises only gas, typically air.

Figure 2:
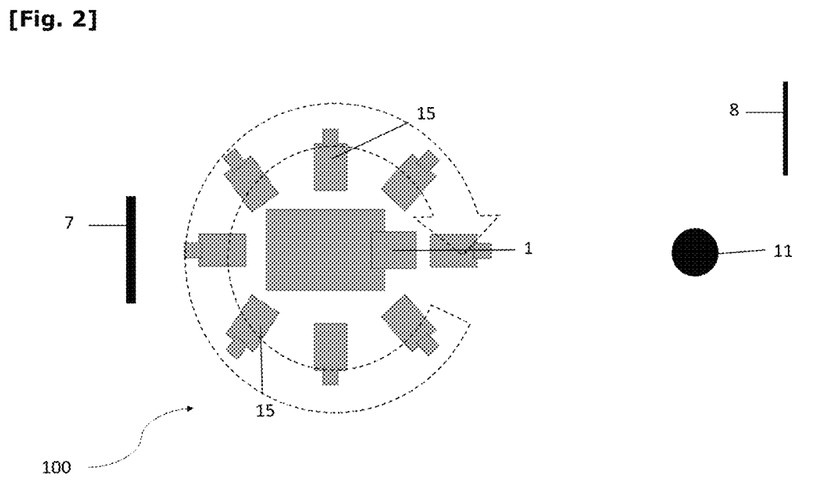
FIG. 2 is a diagrammatic top view of the system according to the invention of FIG. 1.

According to FIGS. 1 and 2, the system (100) also comprises an infrared reference source, called calibration source (8). The calibration source (8) is thermostatically controlled or equipped with means for measuring its temperature. At least one of the distinct images of each panorama images this source (8), at least partially. The processing module (6) is arranged and/or programmed for temperature calibration of the acquired images of the same panorama as a function of this calibration source (8). The calibration source (8) is typically of the blackbody type and its dimension is such that its image on the sensor (1) is wide in the sense that it represents a large number of pixels, for example at least 10×10.

The source 8 is far-field.

By "far-field source" is meant a source that is distant enough that the source is in the depth of field of the system (100). The system (100) then sees the source (8) clearly.

The calibration source (8) is arranged to present to the image sensor (1) an apparent temperature of interest and is advantageously placed at a site that does not disturb the panorama. This source (8) is active or passive, and distinct from or merged with the source (7), or even optional.

By "active" is meant a thermostatically controlled source (8) and by "passive" is meant a non-thermostatically controlled source (8).

The calibration source is thermostatically controlled to a temperature above 33 degrees and/or below 40 degrees. Advantageously, the calibration source (8) is thermostatically controlled to a temperature close to the temperature of the object (11) of interest. In the case of detecting fever, the calibration source (8) is thermostatically controlled to approximately 37° for example.

The system (100) (more precisely the module 6) is arranged and/or programmed to correct the spatial non-uniformity of each distinct image composing a panorama by pixel to pixel subtraction, on each of the distinct images acquired for this panorama, of the spatial non-uniformity of the reference image from this panorama imaging the non-uniformity correction source 7 and adding thereto the mean value of this non-uniformity.

In the portions of panoramic images acquired by the sensor (1), there is a first reference area corresponding to the near reference source (7) and/or the image of the scene in which the image of the calibration source (8) is located.

The near-field source (7) is arranged to record spatial non-uniformities by means of the sensor (1) and the module (6) in order to carry out the correction thereof. This periodic reading of the source (7) by the sensor (1) is used by the module (6) to eliminate the residual non-uniformity in all the portions of the panoramic image, each portion having the same residual non-uniformity pattern. The temporal development of this non-uniformity is slow, given the frequency of presentation of the near-field source (7). In order to limit the influence of the temporal noise, the non-uniformity reading is temporally averaged by the module (6) before proceeding to correction on all the portions of images by the module (6). The portion of the panoramic image in which the source (7) is imaged is advantageously declared to the system by the module (6). The reference source (7) is visible to each panoramic image.

In order not to lose the continuous component of the signal, the non-uniformity is subtracted by the module (6) pixel to pixel from each of the image portions and the mean value of the non-uniformity is added. After re-composition of the image portions (or "stitching") by the module (6), a corrected semi-panoramic image of the parasitic flux internal to the image sensor (1), parasitic flux caused by the objective, is obtained by the module (6). It is a correction in near real time of a point of the image.

According to the variant in question:

the near source (7) is non-thermostatically controlled and its temperature is unknown, while the calibration source (8) is thermostatically controlled. The sources (7) and (8) are thus distinct. The calibration source (8) is present in a part of the panoramic image: its position is known by declaration to the system (100), as well as its temperature. The apparent temperature of the calibration source (8) is selected close to that of the objects (11) of interest, and in particular to an alarm threshold. The calibration source (8) is configured to correct any residual measurement bias after the uniformity correction and improve the detection accuracy by comparing the signal from the scene to the signal from the calibration source (8) in order to trigger an alarm; or the near source (7) is thermostatically controlled. The near source (7) thus fulfils the function of the calibration source (8). The sources (7) and (8) are thus combined in a single source located at the site of the reference (7) in FIG. 1 or 2. The near source (7) forms part of the same hardware assembly as the image sensor (1). The source (7) thus serves both as non-uniformity correction source 7 and temperature measurement reference source 8. The system (100) therefore no longer requires a calibration source (8) and is thus easier to deploy, or the near source (7) is not thermostatically controlled but its immediate temperature is known, and a dynamic calibration of the image sensor (1) is carried out. The near source (7) thus fulfils the function of the calibration source (8). The sources (7) and (8) are thus combined in a single source located at the site of the reference (7) in FIG. 1. If the gain is stable, such a system (100) is easier to produce and removes the need for a heating system, supply system and control loop.

Correction of the atmospheric transmission effects is optionally processed by the module (6) with a digital transmission module parametrized by temperature and humidity measurements accessible via sensors integrated with the image sensor (1). By "integrated sensors" is meant sensors of the thermometer and/or hygrometer and/or weather station type for example.

The processing module (6) is arranged and/or programmed to determine a distance between the object (11) and the image sensor (1) as a function of a dimension of the object (11) on one of the acquired images. The processing module (6) is also arranged and/or programmed to determine a position of the object (11) in a field of an image acquired by the image sensor (1). Finally, the processing module (6) is arranged and/or programmed to correct the temperature of the object (11) as a function of the determined distance between the object (11) and the image sensor (1) and/or as a function of the position of the object (11) in a field of an image acquired by the image sensor (1).

For the image sensor (1), the delivered signal of an object (11) having a fixed apparent temperature is a function of the distance from the object (11) to the sensor (1) and of the angular size of the object (11). The angular size of the object (11) is known by calculating the number of pixels covered by the object (11). As the dimension of the object (11) is known, the distance from the object (11) to the sensor (1) is evaluated. The signal originating from the object (11) is corrected as a function of its distance from the object (11). The correction by the module (6) is more or less improved to correspond as closely as possible to the calibration points reading. This ranges from a simple affine correction as a function of the distance to a combination of more complex corrections such as exponential or power functions for example.

It is possible to teach a neural network implemented by the module (6) to recognise the object (11) and to extract it from the distinct or panoramic image. The influence of the atmospheric transmission on the temperature measurement depends on the ambient temperature and hygrometry. The use of a digital model and local real-time measurements by the system (100) adjusts this correction.

Moreover, the level of visible background signal around the areas of interest influences the temperature measurement. The correction according to the angular size of the object (11) is advantageously parametrized by the signal difference with respect to the local background. An additional correction of the temperature of the object (11) as a function of the position of the object (11) in the field of the thermographic system (100) is implemented by the module (6). This correction is carried out on each image of the scene acquired by the sensor (1), not including the image taken on the near reference source (7) which is already corrected. This correction consists of adding to the detected objects (11) a portion of the thermal contrast between the object (11) and the background around the object (11) using a parabolic function centred on the image. The additional correction compensates for the fact that on some image sensors (1), the source does not have the same far-field signal depending on whether it is placed at the centre or on the periphery of the field, despite a good near-field non-uniformity correction.

The processing module (6) is arranged and/or programmed to determine surface temperature data of said object (11). The system (100) moreover comprises means for measuring the ambient temperature around the object (11). The processing module (6) is arranged and/or programmed to determine an internal temperature of the object (11) as a function of the surface temperature data of said object (11) and of the measured ambient temperature. The measurement means are typically of the thermometer and/or hygrometer type.

The neural network implemented by the module (6) is arranged and/or programmed to recognize the human face considered as the object of interest (11) in the scene. The size of a human face is known with sufficient accuracy to carry out the correction (apparent size, distance) specified above. In order to determine if a person has a fever, it must be able to evaluate the internal body temperature. Only the surface temperature is accessible to the infrared thermography system (100).

A difference is modelled by the module (6) between the internal temperature and the external temperature. The external temperature of an object (11) such as the face in practice depends on the temperature of the ambient air. The temperature of the ambient air measured locally by the image sensor (1) is used by the module (6) to adjust this difference.

The temperature of an object (11) is not uniform. On the face, the eyes, the nasal cavities, the temples, the canthus of the eye, an open mouth are hot while the nose is rather cold for example. The hottest details have small angular dimensions. The details are resolved by the image sensor (1) with a near-field source (7) and/or with a far-field source (8).

The body temperature is determined by the module (6) based on temperature measurements on a non-uniform face.

The hottest parts of the face are considered as visible, either in the current image, or in the following images. One and the same person is potentially seen several times by the image sensor (1) as it moves past, from different angles. The faces or the heads are detected by the neural network implemented by the module (6). The hottest area of the face is read by the module (6). In order to avoid too strong variations associated with the resolution of the hot details, a mean or median filtering among a proportion of the hottest pixels of the face is carried out by the module (6). The face is also partially masked by a hat, a scarf or a mask in certain situations. In this case, the temperature read is below the temperature of the usual hot spots, here masked. When evaluating the temperature, by applying a single correction (normally applied to the visible hot spots), the estimate of the internal temperature is reduced.

The system (100) is arranged and/or programmed to track the detected objects (11) from one image to the other, throughout the video stream. The body temperature is correctly evaluated at the moments when the hottest parts of the face are presented to the image sensor (1), even intermittently during a movement for example.

The processing module (6) is arranged and/or programmed to determine different temperature values of the object (11) over time and to determine the maximum value among all the previously determined values.

For one and the same face tracked in the video stream by the sensor (1), the real body temperature is the maximum value of a series of recent measurements. A series of recent measurements of one and the same object (11) tracked by the sensor (1) is stored in the module (6) so as to retain the maximum value in order to evaluate the internal temperature of the object (11).

The neural network implemented by the module (6) is arranged and/or programmed to recognize the nature of the portions of the face imaged and to differentiate the presence or absence of covering elements on the face. To this end, the neural network is trained to detect these objects (11).

The differences between the internal temperature of the object (11) and the surface temperature are modelled separately. The correction carried out by the module (6) depends on the recognition performed to determine the correct body temperature. Regardless of the area detected by the system (100), the body temperature is correctly evaluated.

The system (100) comprises means for generating a visual or acoustic warning signal if the temperature of the object (11) is above a threshold temperature stored by the processing module (6), or above a temperature difference greater than a threshold difference with respect to temperatures of other objects (11) imaged by the thermographic system (100).

The means for generating a visual or acoustic warning signal are arranged and/or programmed to filter out a false warning signal by comparing different measured temperatures of the object (11). The means for generating a visual or acoustic warning signal are typically of the displayed message type stating the presence of an individual with a fever in a red colour for example.

In the presence of a large stream of persons, it is very unlikely that a majority of individuals have a fever. Therefore only the differential measurements in a group are processed by the module (6) by statistical modelling. The fever criterion is equated to an abnormal temperature increase in one or more individuals with respect to a typical temperature: mean, median, median/mean from among the central values. However, it is not always possible to have a group of a significant number of persons in the field of view simultaneously. The statistical data obtained by the system (100) over a rolling period are used.

A comparison is possible between the signal on a face and that of another face seen by the image sensor (1) in the same portion of the field of view at another moment of a rolling period. Variable thresholds for the relative difference in infrared signal in the field are calculated by the module (6) and continually updated with the measurements carried out in the same area of the field.

A hybrid mode carrying out a fever detection on an absolute temperature measurement on the one hand and on a relative measurement with respect to the local typical infrared signal on the other hand is performed.

A confidence level of the local relative measurement as a function of the local density of samples obtained in a rolling period is calculated by the module (6). If too few samples are obtained in an area, only the absolute measurement is used in the corresponding area. When they are available simultaneously, the absolute and relative modes are combined by relaxing the individual detection thresholds to optimize a good detection rate while limiting the rate of false positives.

The processing module (6) is arranged and/or programmed to eliminate on the images acquired by the image sensor (1) hot spots on the object (11) and/or a background surrounding the object (11) before determining the temperature data of said object (11).

Cleaning up of the image is carried out by the module (6) to eliminate the hot spots by superposing an element having a higher temperature such as a cup of hot coffee for example on the object (11) of interest. It is possible to eliminate the background surrounding the face by positioning a background or an object (11) having a higher temperature around the object (11) of interest such as a face. An analysis of the histogram is then carried out by the module (6) and determines the temperature of the object (11) by averaging the percentages of the highest points in the cleaned-up image.

However, the infrared image does not make it possible to identify the individuals targeted during the facial detection. For example, if a person is detected by the sensor (1) in the middle of a group, it is difficult to identify them in order to stop them. It is very useful to associate an image in the visible spectrum.

The system (100) comprises at least one visible light image sensor (i.e. arranged to capture and image at least one ray, preferably all the radiation, having a wavelength comprised between 450 nm and 750 nm), colour or black and white, arranged to capture the object (11) simultaneously with the infrared image sensor (1).

The at least one visible light image sensor (colour or black and white) comprises a ring 15 of fixed visible image sensors (preferably high resolution) observing a wide panorama, of at least 180° and preferably up to 360°, and which is associated with the image sensor (1). The stream is continually recorded by the sensors over a rolling duration at least longer than the delay between the exposure of the infrared channel and the end of the processing of the information. Knowing exactly the instant of the infrared and visible exposures, the object (11) detected in the infrared channel is also detected by the module (6) in the recent visible recording, the exposure being in the same direction, at the same instant and for the same object (11). An identification by the module (6) with the visible channel is carried out following detection of abnormal temperature in the infrared channel for example.

The visible stream of the visible light image sensor (colour or black and white) is displayed in real time by the control and communication means (9). The operator finds their points of reference more easily in the visible stream than in the infrared. The visible image has a quicker refresh rate than the infrared image. The infrared image provided by the fixed sensors has a frequency greater than 10 Hz, while the infrared panoramic image formed by rotation of a sensor has a more limited rate (of the order of one Hertz).

When the system (100) detects an object (11) with a precise timestamp, it is associated with the track in which at the same moment the object (11) was close to the infrared detection. The temperature and the fever status are then directly associated and displayed by the control and communication means (9) in the panoramic image visible next to the faces detected in movement for example.

In order to have the best detection results by the neural network implemented by the module (6), a preparation of the images by the module (6) is implemented. The acquired images have a fourteen-bit dynamic range, but only a part of this dynamic range is used locally. Neural networks operate best when the full dynamic range is used. To this end, a tone-mapping method implemented by the module (6) reduces the dynamic range to eight bits and improves the use of the dynamic range. The temporal and/or temperature information is used by the module (6) to ensure that the contrast is maximal on the objects (11) of interest. In the case where the objects (11) are faces, these are distinguished from the background by the fact that they are not fixed or/and that they are at a temperature different from the background. If the temperature is estimated from the intensity of a pixel, a fourteen-bit intensity range of interest [m, M] (m and M being parameters of the algorithm which are numbers which define the range of the expected intensities of the objects: m being the minimal value of the range and M being the maximum value) which contain the expected intensities of the objects (11) is defined, and by affine transformation projects this range of fourteen bits onto a range of eight bits, for example [102, 230] (The notation [a, b] here corresponding to the definition of a range between a and b, here being a range of values between 102 and 230, the range thus being comprised within that of [0, 255] of the 8-bit values). The remainder of the image is optionally added by converting, by affine transformation, the range described by the minimum in a pixel neighbourhood and m to [0, 102], and the range described by M and the maximum in a pixel neighbourhood to [230, 255]. The conversion is thus piecewise affine.

In a variant, a background image is determined by the module (6), for example by taking the median in each pixel over a series of images taken with a certain time difference between each image, and regularly updated. The background image, if it is well formed, must not contain objects (11) of interest. In addition, it is assumed that the background is colder than the objects (11), in any case in the places where it can be seen. This background image is used by the module (6) to determine a transformation of the current distinct image which will both allow the background to be seen, but also to highlight what is locally hotter than the background.

This implementation consists of the calculation by the module (6) of the background image Im for example by taking the median of each pixel over a series of distinct images taken with a certain time difference. A low-resolution version L of this image is then constructed by the module (6) by Gaussian pyramid, this being resized to the original size and subtracted from the background image Im to obtain the image H. This has the effect of removing the low-frequency information from the original image and compressing the dynamic range. The 1% and 90% quantiles of the image H are then calculated by the module (6), to be more robust, the non-symmetry is with the presence of hot objects (11) in the background. The images m and M are then calculated by adding respectively the previously calculated quantiles of H to the image L. Finally, for the current image, for each pixel, if the intensity is between the minimum in a neighbourhood of the image and m, the intensity is converted with an affine transformation in the range [0, 25]. Similarly, an intensity in [m, M] is converted by affine transformation to the range [25, 102], and the interval [M, maximum in a neighbourhood] to [102, 255]. Before being provided to the neural network which is implemented by the module (6), the image is recentred around 0.

The images have previously been intensity-calibrated using the systems and/or methods described in the present invention.

An infrared thermographic method will now be described for detecting the temperature of the object (11), implemented by the system (100) comprising collecting infrared radiation by means of the thermal infrared image sensor (1) and constructing at least one image based on this radiation. The method comprises driving the sensor (1) in rotation about the axis of rotation (10) by the drive support (2), the image sensor (1) being fastened on the drive support (2) such that, during the rotation of the drive support (2), the sensor (1) images different distinct areas surrounding the thermographic system comprising said sensor (1) and said drive support (2), the image sensor (1) acquiring several distinct images such that combining these different images forms a continuous panorama of at least 180 degrees about the axis of rotation of the drive support (2). The method also comprises determining, by means of the processing module (6) temperature data of said object (11) based on the images acquired by the image sensor (1).

At least one of the distinct images of each panorama images the near-field infrared reference source (7) called non-uniformity correction source. The processing module (6) corrects a spatial non-uniformity of the images acquired by the sensor (1) as a function of the non-uniformity correction source.

The non-uniformity correction source is situated at a distance from the image sensor (1) such that at least one acquired image, called reference image, images only the non-uniformity correction source.

The processing module (6) corrects the spatial non-uniformity by pixel to pixel subtraction, on each of the acquired images, of the spatial non-uniformity of the reference image imaging the non-uniformity correction source and adding thereto the mean value of this non-uniformity.

The method also comprises a thermostatic control (the calibration source (8) is preferably thermostatically controlled to a temperature above 33 degrees and/or below 40 degrees) and/or a measurement of the temperature of the infrared reference source, called calibration source (8) but also at least one of the distinct images of each panorama imaging this calibration source (8). The processing module (6) calibrates the temperature of the acquired images of one and the same panorama as a function of this calibration source.

The processing module (6) determines a distance between the object (11) and the image sensor (1) as a function of the dimension of the object (11) on one of the acquired images and/or determines the position of the object (11) in a field of an image acquired by the image sensor (1). The processing module (6) corrects the temperature of the object (11) as a function of the determined distance between the object (11) and the image sensor (1) and/or as a function of the position of the object (11) in a field of an image acquired by the image sensor (1).

The processing module (6) determines temperature data of the surface of said object (11). The method also comprises measuring ambient temperature around the object (11), the processing module (6) determining an internal temperature of the object (11) as a function of the surface temperature data of said object (11) and of the measured ambient temperature.

In addition, the processing module (6) determines different temperature values of the object (11) over time and determines the maximum value among all the previously determined values.

The method comprises generating a visual or acoustic warning signal if the temperature of the object (11) is above a threshold temperature stored by the processing module (6). The method comprises generating a visual or acoustic warning signal if the temperature of the object (11) has a temperature difference greater than a threshold difference with respect to temperatures of other objects (11) imaged by the thermographic system (100).

Generating the visual or acoustic warning signal filters out a false warning signal by comparing different measured temperatures of the object (11).

The method comprises capturing, by means of at least one visible light image sensor (colour or black and white), the object (11) simultaneously with the infrared image sensor (1).

The processing module (6) eliminates on the images acquired by the image sensor (1) hot spots on the object (11) and/or a background surrounding the object (11) before determining the temperature data of said object (11).

The system (100) comprises a thermal infrared image sensor (1) with microbolometers of 640 by 480 elements equipped with an open objective at f/1.1 with 25 mm focal length, model TAU 2.7 640 provided by FLIR Systems.

The horizontal field of this sensor (1) is of the order of 25°. The vertical field is of the order of 20° which makes it possible, after the geometric corrections, to obtain the image of a panoramic strip having a height of 18°.

The optical axis can be manually indexed in elevation in the 0° and more or less 6° positions with respect to the horizontal, which makes it possible to rapidly adapt the angle of view in elevation to the situation found at the installation: towards the horizon, towards the sky or towards the ground for example. If the positions are not suitable, a continuous indexing is possible, up to more or less 18°. The benefit of the indexed positions is that they make it possible to define the orientation of the image sensor (1) with sufficient accuracy to apply acceptable geometric corrections without additional calibration.

The system (100) also comprises the drive support (2) arranged to drive the sensor (1) in rotation about an axis of rotation (10).

The drive motor (4) is a low-power compact brushless servomotor, with a high efficiency and high torque, model TC 40 0.32 from the range by manufacturer MPC equipped with a high-resolution resolver. The choice of the resolver is dictated by the need for a high angular resolution, compatible with the expected positioning accuracy. The motor drive electronics are constituted by a WHISTLE module by ELMO with resolver input (10 to 15 bits).

Sixteen exposures on successive angular sectors are carried out by the sensor (1) and constitute an infrared panoramic image over 360°. The panoramic image produced at a field of 360° by 18°. Its format is 16 by 640 columns by 512 rows which is equal to 10,240 columns by 512 rows or 5,242,880 pixels. Its spatial resolution is of the order of 0.6 mrad (18°/512).

The refresh rate of the panoramic images by the sensor (1) is 0.44 Hz, i.e. a new 360° image every 2.3 seconds. This rate is limited by the image frequency of the microbolometer infrared image sensor (1), restricted to 7.5 Hz for reasons of exportability. The image frequency of 7.5 Hz corresponds to an image period of 1000/7.5 or 133 ms per angular sector, to be distributed between the imaging phase and the jump phase. The time necessary for the imaging phase is equal at minimum to the thermal response time of the microbolometer detector, i.e. 3 T which corresponds to 36 ms, added to the read time equal to 33 ms, i.e. 69 ms minimum in total.

A dynamic adjustment of the movement of the sensor (1) is carried out firstly to test the response limits of the system (100):

A jump phase is carried out over approximately 40 ms,
An imaging phase thus lasts up to approximately 90 ms (i.e. 133–40), i.e. more than the 69 ms necessary for the formation and reading of the image on the microbolometer detector,
The return phase lasts approximately 120 ms for a near-complete turn.

For this setting, the average consumption of the system (100) remains very low, of the order of 5 W. The system (100) is arranged to capture a panoramic image in 1.6 s, i.e. in 0.62 Hz for a complete panorama.

In practice, in order to further limit the consumption and reduce the inertia required for the fixed part, the phase chronology proceeds in the following sequence, in the case of imaging a complete panorama over 360°.

Length of a jump phase: Ts=57 ms
Length of an imaging phase: Ti=76 ms (=133–57)
Length of the return phase: Tr=190 ms The duration of 190 ms corresponds to the loss of a complete image during the return phase (57+76+57=190). Under these conditions, the average consumption of the system is approximately 4 W. The analysis time of a complete 360° panorama by the module (6) is 17 by 133 i.e. 2,261 s, which corresponds to an image rate of 0.44 Hz for a complete panorama. This consumption is compatible with the possibilities of supplying power to integrated and on-board equipment.

The system (100) is arranged to switch from a panoramic mode to a mode having a reduced field but a high image rate (or "staring" mode). In fact, it is possible to orient the image sensor (1) in the desired direction in bearing, and to keep the angle of rotation setting constant. The image rate is then taken up to the maximum rate of the image sensor (1), i.e. 7.5 to 30 Hz depending on the model of image sensor selected.

It is advantageous to exploit the high image rate to attach the tracking in bearing to a target (11) of interest at the centre of the field with a conventional image correlation algorithm. This design operates in intermediate modes and monitors a useful area only with a scanning reduced to several sectors that do not represent 360°. It is possible to electronically adjust the origin of the scanning of the sensor (1) in order to further optimize the use and the coverage.

The system (100) is compatible with the use of a visible or near-infrared image sensor by means of adaptation of the porthole. In this case, the time necessary for acquisition of an image by the sensor (1) no longer comprises the same constraints as for a microbolometer detector since it is reduced to several milliseconds. It can thus be envisaged to rise to rates of the order of 1 Hz for a complete panoramic image.

The system (100) comprises the near-field reference source (7) constituted by a passive or active mask according to the variants. The mask made from polyamide is painted with a matt black paint in order to present a good emissivity in the infrared. This source (7) completely masks the first of the sixteen sectors (also called "distinct image") scanned by the image sensor (1), the exploitable panoramic image is thus 337.5° at most. According to the variants, a remote calibration source (8) at 37° C., developed by HGH under the name of CN37 is placed at a distance of several metres from the image sensor (1) in order to cover at least 10 by 10 pixels.

The microbolometer thermal image sensor (1) is implemented with its factory settings taking into account ambient parameters such as the temperature for example and a one-point correction on the internal shutter.

All of the calculations and signal processing described hereafter are carried out by the module (6).

The image sensor (1) thus acquires sixteen successive sector images: the first is the reference image (imaging the source 7) which acts as an additional offset correction, the fifteen others follow and visualize the panorama. The image of the first sector is used to determine the additional offset correction to be applied. The values of this image are:

$$S_0(m,n), \quad \text{[Math. 1]}$$

the values of the following images are:

$$S_i(m,n), i \in [1.15] \quad \text{[Math. 2]}$$

The images corrected with the additional offset become:

$$Sc_i(m, n) = Sc_i(m, n) - S_0(m, n) + \overline{S_0(m, n)} i \in [1.15] \quad \text{[Math. 3]}$$

In order to limit the impact of the temporal noise $S_0$ on the correction, a rolling temporal average of:

$$\overline{S_0} \quad \text{[Math. 4]}$$

is calculated on, for example, ten images before applying this average for the additional correction, as the fixed spatial noise does not develop very quickly over time. Once corrected, the first sector must be almost uniform, i.e. the standard deviation is almost equal to the temporal noise. The addition of the average in the additional correction makes it possible to not lose the continuous component in the processing. Once applied, the correction is perfect over a scene at the ambient temperature of the near reference source (7). The advantage of this correction is that it is in near real time and on a reference source external to the system (100).

In one of the sector images acquired by the sensor (1) the image of the calibration source (8) appears. It is sufficiently wide to produce a spatial average, to which a temporal average is added in order to eliminate the temporal noise component before subtraction from the image signal. The response of the image sensor (1) and the apparent temperature of the source (8) are sufficiently stable over time that they can be considered constant and averaged to reduce the temporal noise thereof. The average level read is compared to any point of the image to determine the temperature of this point. To this end, the system (100) knows the position of the calibration source (8) in the stable image from one panoramic image to the next, and the temperature of the source, which is also stable.

To deduce the temperature of each point of the image, it is necessary to calibrate the response of the image sensor (1) around the temperature of interest, i.e. the temperature of the calibration source (8). Depending on the application, it is necessary to calibrate the image sensor (1) at the factory by presenting it with a blackbody the temperature of which varies from ambient to several hundreds of degrees Celsius. For a fever measurement application, a calibration of several points, for example two or three, around the reference temperature and an affine law are sufficient. In this latter case, the image sensor (1) presents a gain in numerical levels per kelvin around the reference temperature. The module (6) is arranged and/or programmed to calculate the temperature of each pixel as a function of the temperature of the reference source and of the signal difference between the pixel and the source:

$$T_i(m, n) = \frac{(Sc_i(m, n) - \overline{S_{ref}(k, l, t_1, t_2)})}{\text{Gain}} + \text{Tref} \; i \in [1.15] \quad \text{[Math. 5]}$$

In the variant in which there is no calibration source (8), the near source (7) is thermostatically controlled or of a known temperature and acts as reference source 8. The following calculation applies:

$$T_i(m, n) = \frac{(Sc_i(m, n) - \overline{S_{ref}(m, n, t_1, t_2)})}{\text{Gain}} + \text{Tref} \; i \in [1.15] \quad \text{[Math. 6]}$$

In the variant in which there is no calibration source (8) or thermostatic control, a previous calibration of the image sensor (1) is required in order to carry out the calculation:

$$T_i(m, n) = \frac{(Sc_i(m, n) - \overline{S_{ref}})}{\text{Gain}} + \text{Tref} \; i \in [1.15] \quad \text{[Math. 7]}$$

The measured temperature of an object (11) depends on the apparent angular size of this object (11) and its distance from the image sensor (1). The signal is expressed by the following formula:

$$\text{Signal}_{DL} = \text{Signal0}_{DL} \times \left(\frac{SourceAngularSize}{SourceAngularSize0}\right)^{(Power)} \times e^{(-Sigma \times (distance - distance0))} \quad \text{[Math. 8]}$$

More simply, for an object (11) of known size, for example a face, an affine distance correction is applied on the signal of the pixels for which the distance to the image sensor (1) is known before the temperature conversion:

$$T_i(m, n) = \frac{(Sc_i(m, n) - \overline{S_{ref}(k, l, t_1, t_2)} + a * (D_i(m, n) - D_{ref}) + b)}{\text{Gain}} +$$

$$Trefi \in [1.15] \quad \text{[Math. 9]}$$

According to the variant in which there is no calibration source (8), the thermostatically controlled near source (7) acts as the reference source 8. The following calculation applies:

$$T_i(m, n) = \frac{(Sc_i(m, n) - \overline{S_{ref}(m, n, t_1, t_2)} + a * D_i(m, n) + b)}{\text{Gain}} + Trefi \in [1.15] \quad \text{[Math. 10]}$$

According to the variant in which there is no calibration source (8) or thermostatic control, a previous calibration of the image sensor (1) is required in order to carry out the calculation:

$$T_i(m, n) = \frac{(Sc_i(m, n) - \overline{S_{ref}} + a * D_i(m, n) + b)}{\text{Gain}} + Trefi \in [1.15] \quad \text{[Math. 11]}$$

In order to determine the distance at which the object (11) of interest is located with respect to the sensor (1), it is necessary to detect it in the panoramic image. A neural network implemented by the module (6) is used to learn to recognise objects (11) of interest, here faces will be selected, in the infrared. It is common to do it in the visible. The detection is carried out in the infrared in order to outline the presence of faces in the panoramic image. The network is pre-trained on visible images converted to grayscale and refined on annotated infrared images. The network learns and is applied by the module (6) on sectors of the image. The results are combined to obtain detection on the complete panoramic image.

The neural network has thus learned to detect and outline areas corresponding to faces in the panoramic image. The size of an area makes it possible to determine the distance of the face assuming that the person is of an average size of one metre seventy-five for example and the size of the face is equal to for example thirteen percent of the size of the subject. The distance correction is applied by the module (6) on the pixels of the area corresponding to the face and the temperature of each pixel is determined.

A single-stage anchor-free detection network is used, and more particularly a training-time-friendly network (TTFNet). The detection networks are typically of single-stage or two-stage type. Among the single-stage networks, the anchor-based networks which form several specialized detection "heads" for sizes/shapes of fixed target objects (each head being assigned a rectangle—or "anchor box"—which can be interpreted as the typical size/shape of an object for this detection head) are distinguished. The anchor-free networks do not make this specialization, and recent works such as "Bridging the Gap Between Anchor-Based and Anchor-Free Detection via Adaptive Training Sample Selection", CVPR 2020, Zhang et al. make it possible for them to have a performance identical to those that are anchor-based.

With regard to the network architecture, the "head" part of the network corresponds to the part of the network that does not form part of the backbone of the network. The backbone of the network is in a grayscale version, it takes at input a single-channel image, instead of a colour image.

The network is trained with the ADAM learning algorithm ("Adam: A method for stochastic optimization", 2014, Diederik Kingma and Jimmy Ba). The learning rate is halved in the event that the training score does not improve over three consecutive periods.

An increase in data sets adapted to grayscale and infrared in particular is used. With regard to the visual disturbance of the inputs, horizontal rotations, scale changes and translations are carried out as habitually done by detection networks. In addition, a five-point piecewise linear histogram transformation is applied, taken uniformly from [0,255]. The benefit of this data set increase step is to promote a greater insensitivity to the contrast and to the light intensity level of the scene and the target objects (11) for the network. Then, a Gaussian noise having a standard deviation taken uniformly from [0,40] is added.

The object (11) detection network is then trained on data visible in shades of grey then on infrared data. The network learns better because the visible data are more numerous. As the infrared data have a fourteen-bit dynamic range these data are not directly used for the network. Neural networks frequently take images the available dynamic range of which is normalized between −1 and 1 or −127.5 and 127.5 for example. The normalized dynamic range between −127.5 and 127.5 is used. A tone-mapping method implemented by the module (6) is used to reduce the dynamic range to eight bits, while making best use of the available dynamic range.

The training-time-friendly network (or TTFNet) is adapted to respond to several detection needs. The adaptation of the loss function is carried out to perform well on different sizes of target images. In fact, without any changes, the relationship between the parts that make up the loss function depends on the size the network input and the number of classes. The adaptation of the loss function is also carried out so that during learning, the network attempts to reduce the amount of false positives in the images with many or few targets while the training-time-friendly network (TTFNet) divides the penalization by the number of targets.

In addition, a term was added to the loss function in order to more strongly penalize the highest object (11) presence score per class and image of the "mini-batch" at the sites without objects (11). This has the effect of slightly reducing the presence of false detections.

The loss function, using the notation of the training-time-friendly network (or TTFNet), is therefore:

$$L = L_{pos} + L_{neg} + L_{neg2} + 5L_{reg} \quad \text{[Math. 12]}$$

I.e. B the dimension of the batch, and $N_p$ the size of the heatmap of the mini-batch $$N_p = \frac{B \cdot W \cdot H}{r^2}, \text{ then} \quad \text{[Math. 13]}$$

$$L_{pos} = -\frac{1}{M} \sum_{bijc} (1 - \widetilde{H_{bijc}})^2 \log \widetilde{H_{bijc}} 1_{(H_{bijc}==1)} \quad \text{[Math. 14]}$$

$$L_{neg} = -\frac{1e5}{N_p \cdot c} \sum_{bijc} (1 - H_{bijc})^4 \widetilde{H_{bijc}}^2 \log(1 - \widetilde{H_{bijc}}) 1_{H_{bijc}<1} \quad \text{[Math. 15]}$$

W·H corresponds to the size of the image analysed during the learning and later for the detection (identical to the size of a sector). R corresponds to the output stride factor, i.e. the detection stride set at 4. As a reminder, M is the number of objects (11) present in the images of the mini-batch.

$$M = \sum_{bijc} 1_{H_{bijc}==1} \quad \text{[Math. 16]}$$

b is the batch index.
To make the link with the training-time-friendly network (or TTFNet), $$L_{loc} = L_{pos} + \frac{N_p \cdot c}{1e5}\left(\frac{1}{M}\right)L_{neg} \quad \text{[Math. 17]}$$

$L_{pos}$ encourages the network to predict 1 on the heatmap if an object (1) is present.
The present invention divides the contribution of each pixel in question by the number of objects (11).

$$L\_neg \quad \text{[Math. 18]}$$

encourages the network to predict 0 on the heat map if an object (11) is not present (with the technique, introduced with "Cornernet: Detecting objects as paired keypoints", ECCV 2018, Hei Law and Jia Deng, for reducing the penalty around the centres of the objects (11) in order to take into account the inaccuracy of the definition of the centre of the objects (11)). Normalization is carried out by the number of pixels of the heatmap where 0 is to be predicted. As the heatmap has c channels (one channel per class) and $N_p$ pixels, normalization is carried out by $$N_p \cdot c \quad \text{[Math. 19]}$$

M is subtracted, but M is insignificant with respect to $$N_p \quad \text{[Math. 20]}$$

Finally, multiplication by one hundred thousand is carried out in order to give much greater significance to $$L_{neg} \quad \text{[Math. 21]}$$

with respect to $$L_{pos} \quad \text{[Math. 22]}$$

This ratio means that the optimal detection threshold of the final network ends up as approximately 0.20. Without these modifications, the relationship between $$L_{pos} \quad \text{[Math. 23]}$$

and $$L_{neg} \quad \text{[Math. 24]}$$

depends on the number of pixels in the image, and thus the optimal threshold depends on the size of the image, as well as the number of classes.
Finally $$L_{neg2}, \quad \text{[Math. 25]}$$

which contributes slightly to the loss function, is defined by:

$$L_{neg2} = -\frac{1}{B \cdot c}\sum_{bc} \text{MAX}_{ij}\left((1-H_{bijc})^4 \widetilde{H_{bijc}}^2 \log(1 - \widetilde{H_{bijc}}) 1_{H_{bijc}<1}\right) \quad \text{[Math. 26]}$$

Of course, the invention is not limited to the examples that have just been described, and numerous modifications may be made to these examples without exceeding the scope of the invention.

Of course, the various characteristics, forms, variants and embodiments of the invention can be combined together in various combinations inasmuch as they are not incompatible or mutually exclusive. In particular, all the variants and embodiments described above can be combined together.

The invention claimed is:

1. An infrared thermographic system configured to measure the temperature of an object, comprising:
    a thermal infrared image sensor arranged to collect infrared radiation and construct at least one image based on this radiation;
    a drive support arranged to drive the thermal infrared image sensor in rotation about an axis of rotation, the thermal infrared image sensor being fastened on the drive support such that, during a rotation of the drive support, the thermal infrared image sensor images different distinct areas surrounding the infrared thermographic system, the thermal infrared image sensor being arranged to acquire several distinct images such that combining these different images forms a continuous panorama of at least 180 degrees about the axis of rotation of the drive support;
    a processing module arranged and/or programmed to measure a temperature of said object based on the images acquired by the thermal infrared image sensor;
    a near-field infrared reference source called non-uniformity correction source, the drive support being arranged to drive the thermal infrared image sensor in rotation about an axis of rotation, the thermal infrared image sensor being fastened on the drive support such that at least one of the distinct images of each panorama images the non-uniformity correction source, the processing module being arranged and/or programmed to correct a spatial non-uniformity of the acquired images as a function of the non-uniformity correction source;
    and the non-uniformity correction source is situated at a distance from the thermal infrared image sensor such that at least one acquired image, called reference image, images only the non-uniformity correction source; and
    the near-field infrared reference source is close enough to the thermal infrared image sensor to be situated outside a depth of field of the optical system optically connecting the source to the thermal infrared image sensor, such that, for at least one position of the drive support, the thermal infrared image sensor in the focal plane of the optical system is arranged to intercept only light radiation originating from the source in a focal plane of the optical system optically connecting the source to the thermal infrared image sensor.

2. The infrared thermographic system according to claim 1, characterized in that said infrared thermographic system comprises an optical system, the optical system optically connecting the near-field infrared reference source to the thermal infrared image sensor.

3. The infrared thermographic system according to claim 2, characterized in that the optical system is situated between the near-field reference source and the thermal infrared image sensor.

4. The infrared thermographic system according to claim 1, characterized in that the processing module is arranged and/or programmed to correct the spatial non-uniformity by pixel to pixel subtraction, on each of the acquired images, of the spatial non-uniformity of the reference image imaging the non-uniformity correction source.

5. The infrared thermographic system according to claim 1, characterized in that aid thermographic system comprises an infrared reference source, called calibration source, thermostatically controlled or equipped with means for measuring a temperature of said source, at least one of the distinct images of each panorama imaging said calibration source, the processing module being arranged and/or programmed for temperature calibration of the acquired images of one and the same panorama as a function of said calibration source.

6. The infrared thermographic system according to claim 5, characterized in that the calibration source is thermostatically controlled to a temperature above 33 degrees and/or below 40 degrees.

7. The infrared thermographic system according to claim 1, characterized in that the processing module is arranged and/or programmed to:
  determine a distance between the object and the thermal infrared image sensor as a function of a dimension of the object on one of the acquired images and/or determine a position of the object in a field of an image acquired by the thermal infrared image sensor; and
  correct the temperature of the object as a function of the determined distance between the object and the thermal infrared image sensor and/or as a function of the position of the object in a field of an image acquired by the thermal infrared image sensor.

8. The infrared thermographic system according to claim 1, characterized in that said infrared thermographic system comprises at least one visible light image sensor, arranged to capture the object simultaneously with the thermal infrared image sensor.

9. The infrared thermographic system according claim 1, characterized in that the processing module is arranged and/or programmed to measure a surface temperature of said object, the system further comprising means for measuring ambient temperature around the object, the processing module being arranged and/or programmed to measure an internal temperature of the object as a function of the surface temperature of said object and of the measured ambient temperature.

10. The infrared thermographic system according to claim 1, characterized in that the processing module is arranged and/or programmed to determine different temperature values of the object over time and to determine the maximum value among all the previously determined values.

11. The infrared thermographic system according to claim 1, characterized in that said infrared thermographic system comprises means for generating a visual or acoustic warning signal if the temperature of the object:
  is above a threshold temperature stored by the processing module, or
  has a temperature difference greater than a threshold difference with respect to temperatures of other objects imaged by the thermographic system.

12. The infrared thermographic system according to claim 11, characterized in that the means for generating a visual or acoustic warning signal are arranged and/or programmed to filter out a false warning signal by comparing different measured temperatures of the object.

13. The infrared thermographic system according to claim 1, characterized in that the processing module is arranged and/or programmed to eliminate, on images acquired by the thermal infrared image sensor:
  hot spots on the object, and/or
  a background surrounding the object
before measuring a temperature of said object.

14. An infrared thermographic method for measuring the temperature of an object, comprising:
  collecting infrared radiation by means of a thermal infrared image sensor and constructing at least one image based on said radiation;
  driving the thermal infrared image sensor in rotation about an axis of rotation by means of a drive support, the thermal infrared image sensor being fastened on the drive support such that, during the rotation of the drive support, the thermal infrared image sensor images different distinct areas surrounding a thermographic system comprising said thermal infrared image sensor and said drive support, the thermal infrared image sensor acquiring several distinct images such that combining these different images forms a continuous panorama of at least 180 degrees about the axis of rotation of the drive support; and
  measuring, by a processing module, the temperature of said object based on images acquired by the thermal infrared image sensor, at least one of the distinct images of each panorama imaging a near-field infrared reference source called non-uniformity correction source, the processing module correcting a spatial non-uniformity of the acquired images as a function of the non-uniformity correction source, the non-uniformity correction source being situated at a distance from the thermal infrared image sensors such that at least one acquired image, called reference image, images only the non-uniformity correction source; and
  the near-field infrared reference source is close enough to the thermal infrared image sensor to be situated outside a depth of field of the optical system optically connecting the source to the thermal infrared image sensor, such that, for at least one position of the drive support, the thermal infrared image sensor in a focal plane of the optical system is arranged to intercept only light radiation originating from the source in the focal plane of the optical system optically connecting the source to the thermal infrared image sensor.

15. The infrared thermographic method according to claim 14, characterized in that the processing module corrects the spatial non-uniformity by pixel to pixel subtraction, on each of the acquired images, of the spatial non-uniformity of the reference image imaging the non-uniformity correction source.

16. The infrared thermographic method according to claim 14, characterized in that the processing module:
  determines a distance between the object and the thermal infrared image sensor as a function of a dimension of the object on one of the acquired images and/or determines a position of the object in a field of an image acquired by the thermal infrared image sensor, and
  corrects the temperature of the object as a function of the determined distance between the object and the thermal infrared image sensor and/or as a function of the position of the object in a field of an image acquired by the thermal infrared image sensor.

17. The infrared thermographic method according to claim 14, characterized in that the processing module eliminates on images acquired by the thermal infrared image sensor:
 hot spots on the object, and/or
 a background surrounding the object
before measuring a temperature of said object.

\* \* \* \* \*